(12) United States Patent
Misono et al.

(10) Patent No.: US 6,425,836 B1
(45) Date of Patent: Jul. 30, 2002

(54) BASEBALL OR SOFTBALL BAT

(75) Inventors: Kazunori Misono; Masaaki Okuyama; Toshiaki Kida; Kazuya Ishida, all of Osaka (JP)

(73) Assignee: Mizuno Corporation, Osaka (JP)

( * ) Notice: Subject to any disclaimer, the term of this patent is extended or adjusted under 35 U.S.C. 154(b) by 0 days.

(21) Appl. No.: 09/465,977

(22) Filed: Dec. 15, 1999

Related U.S. Application Data

(63) Continuation of application No. PCT/JP99/03723, filed on Oct. 19, 1998.

(51) Int. Cl.$^7$ .............................................. A63B 59/06
(52) U.S. Cl. ................................ 473/567; 473/566
(58) Field of Search ................................. 473/566, 567

(56) References Cited

U.S. PATENT DOCUMENTS

| | | | |
|---|---|---|---|
| 1,611,858 A | 12/1926 | Middlekauff | |
| 3,861,682 A | 1/1975 | Fujii | 273/72 A |
| 3,963,239 A | 6/1976 | Fujii | 273/72 A |
| 4,014,542 A | * 3/1977 | Tanikawa | 473/567 |
| 4,505,479 A | * 3/1985 | Souders | 473/567 |
| 4,546,976 A | 10/1985 | Jones | 273/72 R |
| 4,569,521 A | 2/1986 | Mueller | 273/72 A |
| 4,848,745 A | 7/1989 | Bohannan et al. | 273/72 R |
| 4,931,247 A | * 6/1990 | Yeh | 473/267 |
| 5,104,123 A | 4/1992 | Okitsu et al. | 273/72 A |
| 5,301,940 A | 4/1994 | Seki et al. | 273/72 R |
| 5,364,095 A | 11/1994 | Easton et al. | 273/72 A |
| 5,415,398 A | 5/1995 | Eggiman | 273/72 A |
| 5,458,330 A | 10/1995 | Baum | 273/72 R |
| 5,676,610 A | 10/1997 | Bhatt et al. | 473/566 |
| 5,695,419 A | 12/1997 | Haringa | 473/564 |
| 5,722,908 A | * 3/1998 | Feeney et al. | 473/567 |
| 5,811,041 A | 9/1998 | Snow | 264/102 |
| 5,899,823 A | * 5/1999 | Eggiman | 473/566 |
| 6,022,282 A | 2/2000 | Kennedy et al. | 473/567 |
| 6,036,610 A | 3/2000 | Lewark | 473/564 |
| 6,042,493 A | * 3/2000 | Chauvin et al. | 473/566 |
| 6,053,828 A | 4/2000 | Pitsenberger | 473/566 |
| 6,056,655 A | 5/2000 | Feeney et al. | 473/567 |
| 6,251,034 B1 | 6/2001 | Eggiman et al. | 473/567 |

FOREIGN PATENT DOCUMENTS

| | | |
|---|---|---|
| JP | 50-7976 | 3/1975 |
| JP | 51-13165 | 4/1976 |
| JP | 60-47860 | 10/1985 |
| JP | 63-38477 | 2/1988 |
| JP | 1-117379 | 8/1989 |
| JP | 6-34845 | 5/1994 |
| JP | 6-64675 | 9/1994 |
| JP | PCT/JP99/03723 | 11/1999 |

* cited by examiner

*Primary Examiner*—Mark S. Graham
(74) *Attorney, Agent, or Firm*—Troutman Sanders LLP; Gerald R. Boss

(57) ABSTRACT

A baseball or softball bat capable of increasing the hit distance of a ball and reducing the manufacturing cost can be obtained. A baseball or softball bat (1) including a hitting portion (2), a taper portion (3), and a grip portion (4) has a tubular member (6a, 6b) which includes an outer circumference plane (25) extending from the hitting portion (2) to the grip portion (4) and an inner circumference plane (26) located inside the outer circumference plane (25) and extending from the hitting portion (2) to the grip portion (4), and a metal tubular member (8) which is placed between the outer circumference plane (25) and the inner circumference plane (26) at least in the hitting portion (2), the metal tubular member (8) having a weak boundary layer (7) formed on its surface.

13 Claims, 6 Drawing Sheets

BASEBALL OR SOFTBALL BAT

This is a continuation of PCT/JP99/03723 filed Oct. 29, 1998.

TECHNICAL FIELD

The present invention relates to baseball or softball bats. More particularly, the present invention relates to a baseball or softball bat capable of increasing the hit distance of a ball and reducing the manufacturing cost.

BACKGROUND ART

Conventionally, the baseball or softball bat (hereinafter, referred to as a bat) market deals with bats of various materials. For example, there are wooden bats, metal bats made of titanium alloys or aluminum alloys, and fiber reinforced plastic (hereinafter, referred to as FRP) bats which are manufactured by impregnating a matrix resin, represented by an epoxy resin and other synthetic resins, into yarns, cloths, Sleeves or the like, which are formed of carbon fibers, glass fibers or the like, and curing the impregnated yarns, doths, sleeves or the like.

In order to improve the rebound characteristics of a bat when it hits a ball, Japanese Patent Publication No. 50-7976, for example, previously proposed a metal bat with a double pipe structured hitting surface which is formed by bonding a metal pipe of a suitable length inside the hitting surface of the bat body.

Japanese Utility Model Publication No. 51-13165 also proposed a metal bat with a triple structured hitting surface which is formed by bonding a metal pipe of a suitable length inside the hitting surface of the bat body, and then inserting and adhering a lubber or synthetic resin plate or pipe in the interlayer of double pipes, which are formed of the bat body and the bonded metal pipe, (in the layer between the bat body and the bonded metal pipe).

U.S. Pat. No. 5,415,398 also proposed a bat which has a tubular insert placed and bonded inside the hitting portion of the bat body so as to leave a gap between the insert and the bat body, or a bat which contains grease sealed in the gap.

However, the conventionally proposed bats as described above have the following problems.

As described above, the bat disclosed in Japanese Patent Publication No. 50-7976 has a metal pipe of a suitable length bonded inside the hitting surface of the bat body. In manufacturing such a bat, a metal pipe is inserted and bonded in the hitting surface of the bat body while the pipe is under heavy load or pressure. In the process of inserting and bonding the metal pipe, the inner wall of the hitting surface of the bat body may be damaged. If the inner wall of the hitting surface is thus damaged, the bat may crack from the damaged portion or may be broken in use.

The bat disclosed in Japanese Utility Model Publication No. 51-1316 has a rubber or synthetic resin plate placed in the interlayer of double pipes as described above. That causes a dull sound and reduces the rebound characteristics of the bat when the bat hits a ball.

A bat body deforms more as the bat hitting portion is thinner. The bat can hit a ball farther by utilizing the force of restoring the bat body from the deformed shape to the original shape. When the bat body hitting portion is too thin, however, the strength of the bat body is insufficient. Therefore, the bat body may dent or crack when hitting a ball.

In order to solve such problems, the bat disclosed in U.S. Pat. No. 5,415,398 has the above described structure to prevent the outer shell wall of the thin bat body from being plastically deformed by impact stress caused when the bat hits a ball. Therefore, the bat body can deform in a range which allows elastic deformation without causing plastic deformation. Then, the force of restoring the outer shell wall of the bat body from its elastically deformed state (force by spring reaction) can improve the rebound force against a ball. In other words, the bat disclosed in U.S. Pat. No. 5,415,398 satisfies the both demands of improving the rebound characteristics for hitting a ball farther and securing a sufficient strength of a bat by combining the thin outer shell wall of the bat body and the insert placed to leave a gap between the insert and the outer shell.

Further, grease which is sealed in the gap enables smooth transfer of impact force, which is caused when the bat hits a ball, from the outer shell wall of the bat body to the tubular insert. As a result, the rebound characteristics of the bat can be improved further.

As described above, the bat disclosed in U.S. Pat. No. 5,415,398 has superior rebound characteristics and can increase the hit distance of a ball.

However, the bat disclosed in U.S. Pat. No. 5,415,398 requires formation of a minute gap between the bat body and the tubular insert at a high dimensional accuracy in order to realize the above described superior rebound characteristics. To implement good rebound characteristics at the entire circumference of the bat, it is also necessary to strictly control and set the height of the gap between the bat body and the tubular insert so as to be uniform at the entire circumference of the bat. Accurate formation of such a minute gap in the bat manufacturing process takes a lot of trouble and time, which results in the increased bat manufacturing cost.

Although above described U.S. Pat. No. 5,415,398 discloses a bat which contains grease sealed in the gap, the grease in this case has to be relatively high in viscosity because a failure such as leakage of the grease from the gap to the outside of the bat in use should be prevented. Since the process of sealing such viscous grease inside the gap also takes a lot of trouble and time, the bat manufacturing cost is further increased.

DISCLOSURE OF THE INVENTION

One object of the present invention is to provide a baseball or softball bat capable of increasing the hit distance of a ball and reducing the manufacturing cost.

Another object of the present invention is to provide a method of manufacturing a baseball or softball bat capable of increasing the hit distance of a ball and reducing the manufacturing cost.

According to one aspect of the present invention, a baseball or softball bat including a hitting portion, a taper portion, and a grip portion includes a tubular member and a metal tubular member. The tubular member includes an outer circumference plane extending from the hitting portion to the grip portion, and an inner circumference plane located inside the outer circumference plane and extending from the hitting portion to the grip portion. The metal tubular member is placed between the outer circumference plane and the inner circumference plane at least in the hitting portion The metal tubular member has a weak boundary layer formed on its surface.

Since the metal tubular member is placed between the outer circumference plane and the inner circumference plane of the tubular member is described above, the metal tubular member can improve the strength and durability of the bat.

That is, the tubular member can be made thinner while the bat strength is maintained as compared with a case where the metal tubular member is not placed. Further, by forming the weak boundary layer, the tubular member and the metal tubular member can deform independently from each other when the bat hits a ball. Therefore, as compared with a case where the tubular member and the metal tubular member are bonded at nearly the entire contact plane, a portion of the tubular member which is located on the outer circumference side of the metal tubular member can elastically deform easily when the bat hits a ball. The force of restoring the portion of the tubular member from the elastically deformed state can increase further the hit distance of a ball. It is noted that the weak boundary layer is a layer which exists on the surface of a body to be bonded (the surface of the metal tubular member) and does not have the mechanical strength higher than a targeted bond strength. The weak boundary layers are, for example, grease which covers a metal surface and a lubricant for a molded plastic surface. In a region where the weak boundary layer is formed, the metal tubular member and the tubular member contact with each other without being bonded.

If the weak boundary layer is formed on the surface of the metal tubular member in this manner, the effects as described above similar to a case where a tubular insert is placed inside the tubular member so as to leave a gap therebetween can be obtained, and the conventional complicated process of adjusting the height of the gap is unnecessary. In other words, a bat can be manufactured so that the surface of the metal tubular member and the tubular member contact with each other with the weak boundary layer therebetween. Since the bat manufacturing process can be simplified as a result, the increase in the bat manufacturing cost can be prevented.

Since the bat strength against impact when hitting a ball is prevented from being insufficient by the metal tubular member, accidents such as cracking of the bat tubular member and breaking of the bat due to impact when the bat hits a ball can be prevented.

Since the metal tubular member is placed between the outer circumference plane and the inner circumference plane of the tubular member, the bat according to the present invention can have a structure in which the metal tubular member is buried in the tubular member. According to such a structure, the position of the metal tubular member can be fixed without bonding the surface of the metal tubular member and the tubular member with adhesive, for example (while a weak boundary layer is formed on the surface of the metal tubular member).

In the baseball or softball bat according to the one aspect, the tubular member may include a first layer located on the outer circumference side of the metal tubular member and a second layer located on the inner circumference side of the metal tubular member.

In this case, the first and second layers can be formed of different materials from each other. Therefore, a material which is elastically deformed easily by impact force when a bat hits a ball is used for the first layer to improve further the rebound characteristics of the bat, a material which is higher in rigidity than the first layer is used for the second layer, and thus the bat strength and durability can be improved. As a result, the accident of a broken bat, for example, can be prevented while increasing the rebound characteristics of the bat.

In the baseball or softball bat according to the one aspect, the weak boundary layer may include a layer which is formed by providing non-adhesive surface treatment on the surface of the metal tubular member.

In this case, the bond between the surface of the metal tubular member on which the weak boundary layer is formed and the tubular member can be reliably prevented.

In the baseball or softball bat according to the one aspect, the weak boundary layer may include at least one selected from the group of a layer with a mirror surface finished upper surface, a plated layer, a lubricant coated layer, and an oxide film coated layer.

In the baseball or softball bat according to the one aspect, the weak boundary layer may be formed on one of the outer and inner circumference planes or on both the outer and inner circumference planes of the metal tubular member.

When the weak boundary layer is formed on both the outer and inner circumference planes of the metal tubular member as described above, the three parts of the metal tubular member, a portion of the tubular member which is located on the outer circumference side of the metal tubular member, and a portion of the tubular member which is located on the inner circumference side of the metal tubular member can elastically deform independently from one another when the bat hits a ball. Therefore, the hit distance of a ball can be increased further by transferring to the hit ball the force of restoring the three parts from the elastically deformed state.

When the weak boundary layer is formed only on the outer circumference plane of the metal tubular member, a portion of the tubular member which is located on the inner circumference plane side of the metal tubular member can function as a reinforcing member for increasing the strength of the metal tubular member. As a result, the bat strength can be increased further.

In the baseball or softball bat according to the one aspect, the tubular member may include a fiber reinforced plastic (FRP).

In the baseball or softball bat according to the one aspect, the tubular member may be formed by impregnating a resin into a fiber member which is formed to a tubular shape.

According to another aspect of the present invention, a method of manufacturing a baseball or softball bat including a hitting portion, a taper portion, and a grip portion includes the steps of forming a tubular inner circumference layer to extend from the hitting portion to the grip portion, placing a metal tubular member at least on a region of the inner circumference layer which is to be the hitting portion, forming a weak boundary layer on the surface of the metal tubular member, and forming a tubular outer circumference layer to cover at least the metal tubular member.

By thus placing the metal tubular member on the inner circumference layer and forming the outer circumference layer on the metal tubular member, the baseball or softball bat according to the one aspect can be manufactured easily.

Unlike the conventional bat manufacturing method, a step of forming a gap between the metal tubular member and the inner circumference layer or the outer circumference layer is not performed, and therefore complication of the manufacturing process can be prevented. As a result, the bat manufacturing cost can be reduced.

In the method of manufacturing a baseball or softball bat according to the another aspect, the step of foing the weak boundary layer may include the step of providing non-adhesive surface treatment on the surface of the metal tubular member.

In this case, the weak boundary layer can be formed easily on the surface of the metal tubular member.

In the method of baseball or softball bat according to the another aspect, the non-adhesive surface treatment may include at least one selected from the group of mirror surface finish, plating finish, lubricant coating, and oxide film coating.

In the method of manufacturing a baseball or softball bat according to the another aspect, the step of forming the inner circumference layer may include the step of forming a tubular inner circumference fiber layer to extend from the hitting portion to the grip portion, and the step of forming the outer circumference layer may include the step of forming an tubular outer circumference fiber layer to cover at least the metal tubular member. Further, the step of impregnating a resin into the inner circumference fiber layer and the outer circumference fiber layer may be included.

In the method of manufacturing a baseball ox softball bat according to the another aspect, the step of applying pressure an the inner circumference layer toward the outer circumference layer may be further included.

In the method of manufacturing a baseball or softball bat according to the another aspect, the inner and outer circumference layers may include fiber reinforced plastic.

In the method of manufacturing a baseball or softball bat according to the another aspect, carbon fiber, glass fiber, aramid fiber, or other reinforcing fibers can be used for the reinforcing fiber member for the fiber reinforced plastic, the inner circumference fiber layer, or the outer circumference fiber layer. As the orientation anne of these reinforcing fiber, a combination of 0° to 45° or 0° to 90° with respect to the longitudinal direction of the bat is possible. The type and orientation angle combination of the reinforcing fibers are determined by the strength and other properties required for the bat.

In the method of manufacturing a baseball or softball bat according to the another aspect, a thermosetting synthetic resin such as an epoxy resin or a thermoplastic synthetic resin such as a polyurethane resin may be used as the matrix resin of fiber reinforced plastic.

According to still another aspect of the present invention, a fiber reinforced plastic (FRP) baseball or softball bat including a hitting portion, a taper portion, and a glip portion is characterized in that a metal tubular member having a weak boundary layer (WBL) is buried and integrated in the interior of the fiber reinforced plastic layer (FRP layer) which corresponds to the hitting portion.

Therefore, the FRP layer can be made thinner while the necessary strength as the FRP bat is maintained. Further, by thus burying the metal tubular member having the weak boundary layer inside the FRP layer, a non-adhesive interface dissociation layer can be formed at the boundary plane of the surface of the metal tubular member on which the weak boundary layer is formed and the matrix resin layer of the FRP layer. On the non-adhesive interface dissociation layer, a physical phenomenon in a springback manner is instantaneously caused between the metal tubular member and the FRP layer when the bat hits a ball. As a result, the springback physical phenomenon can improve the rebound characteristics of the bat.

Since the FRP layer exists even on the inner circumference side of the metal tubular member, plastic deformation of the metal tubular member itself due to impact force when the bat hits a ball can be prevented effectively. As a result, the durability of the bat can be improved.

In the baseball or softball bat according to the still another aspect, the metal tubular member may be buried and integrated between the FRP outer and inner shell layers of the fiber reinforced plastic layer.

In this case, the metal tubular member is completely buried and integrated in the FRP layer, and therefore the FRP outer shell layer can be made thinner while the strength required as the FRP bat is maintained. As a result, the rebound characteristics of the bat can be improved, which in turn can improve the hit distance of a ball.

Since the FRP inner shell layer exists on the inner circumference side of the metal tubular member, the FRP inner shell layer can function as a reinforcing member for the metal tubular member. As a result, the durability of the PRP bat can be improved reliably.

In the baseball or softball bat according to the still another aspect, the weak boundary layer may be a region in which mirror surface finish, plating finish, lubricant coating, oxide film coating, or other physical or chemical non-adhesive surface treatment is applied on the surface of the metal tubular member. Further, the weak boundary layer may be formed on one of the outer and inner circumference sides or on both the outer and inner circumference sides of the metal tubular member.

As described above, in the baseball or softball bat according to the still another aspect, the bat hitting portion is the three-layer structure of two thin FRP layers and one layer of the metal tubular member. There is not any gap provided between the layers When the FRP layers and the layer of the metal tubular member are completely adhered, the above described three layers integrally deform when the bat hits a ball. Thus, they virtually deform just as one thick FRP layer. Since the elastic deformation amount of the FRP layer is very small in this case, the effect of increasing the hit distance of a ball by utilizing the force of restoring the layers from the elastically deformed state is relatively small.

In the bat according to the present invention, however, adhesion of the FRP layers and the metal tubular member, for example, of an aluminum alloy pipe is prevented by formation of the weak boundary layer. Therefore, the FRP layers and the metal tubular member can move independently from one another. Thus, the rigidity of the bat in the direction of deformation is made extremely small. As a result, the rebound characteristics of the bat when hitting a ball can be improved remarkably, and therefore the hit distance of a ball can be increased.

Unlike the conventional bat disclosed in U.S. Pat. No. 5,415,398, the bat according to the present invention does not require strict control and adjustment of the size of a gap between the metal tubular member (pipe-shaped insert) and the bat body in the manufacturing process, and the step of sealing grease in the gap. For the bat according to the present invention, therefore, the manufacturing process can be simplified. Further, the problem of fluctuated rebound characteristics of a bat caused by fluctuated gap size does not occur for the bat according to the present invention.

As described above, in the bat according to the present invention, the reliable quality can be secured, the manufacturing cost can be reduced at the same time, and the hit distance of a ball can be increased.

In the baseball or softball bat according to the one or still another aspect, carbon fiber, glass fiber, aramid fiber, or other reinforcing fibers can be used for the reinforcing fiber member for the FRP or the fiber member. As the orientation angle of these reinforcing fibers, a combination of 0° to 45° or 0° to 90° with respect to the longitudinal direction of the bat is possible. Further, the type and the orientation angle combination of the reinforcing fibers are determined by the strength and other properties required for the bat.

In the baseball or softball bat according to the one or still another aspect, a thermosetting synthetic resin such as an epoxy resin or a thermoplastic resin such as a polyurethane resin can be used as the matrix resin of FRP.

In the method of manufacturing a baseball or softball bat according to the another aspect, the reaction injection molding (RIM) process and the resin transfer (RTM) process can be used. In this case, by sucking and exhausting a mold, in which the external Shape of the bat is prepared, from the bat top end or the grip end and simultaneously introducing a matrix resin into the mold from the grip end or the top end, which are located opposite from the sucked and exhausted portion, a uniform matrix resin without air bubbles can be introduced into the mold. As a result, a high quality bat which does not include defects such as air bubbles in the matrix resin can be obtained.

In the baseball or softball bat according to the one or still another aspect, or in the method of manufacturing a baseball or softball bat according to the another aspect, an aluminum alloy pipe may be used as the metal tubular member.

In the baseball or softball bat according to the one or still another aspect, or in the method of manufacturing a baseball or softball bat according to the another aspect, 6000 type or 7000 type aluminum alloys according to the ASTM standard can be used as a material for forming the metal tubular member. Of the aluminum alloys, 7001, 7049, 7060, 7075, 7178, 6061 which particularly satisfy the ASTM standard are preferably employed. By using such aluminum alloys, the strength and durability of a bat can be improved further.

In the baseball or softball bat according to the one or still another aspect, or in the method of manufacturing a baseball or softball bat according to the another aspect, an titanium alloy or pure titanium can be used as a material for forming the metal tubular member. For example, β type or α+β it type titanium alloys are preferably used.

As other materials for forming the metal tubular member, other titanium alloys (sudh as Ti-6Al-4V, Ti-4Al-22V, Ti-15V-3Cr-3Al-3Sn, Ti-4.5Al-3V-2Fe-2Mo, Ti-10V-2Fe-3Al) can be used.

BEST MODES FOR CARRYING OUT THE INVENTION

Figure 1:
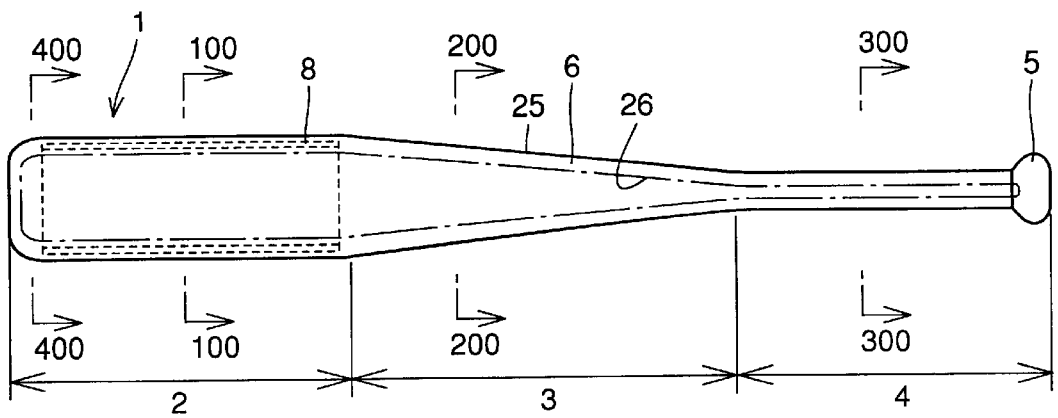
FIG. 1 is a schematic side view illustrating an FRP bat according to a first embodiment of the present invention.

In the following, the embodiments of the present invention will be described with reference to the drawings. The same or corresponding parts in the drawings are denoted by the same reference characters and the description will not be repeated.

First Embodiment

FIG. 1 is a schematic sectional view of an FRP baseball or softball bat according to the present invention. Referring to FIG. 1, a bat 1 includes a hitting portion 2, a taper portion 3, and a grip portion 4. The end of grip portion 4 is called a grip end 5. In hitting portion 2, a metal tubular member 8 is buried and integrated inside an FRP layer 6 which is the tubular member of bat 1.

Figure 2:
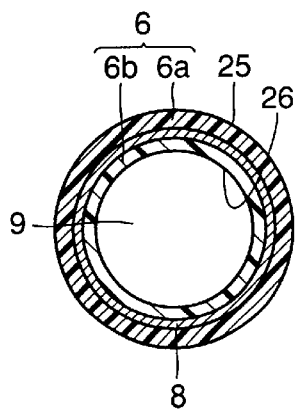
FIG. 2 is a schematic sectional view along line 100—100 in FIG. 1.
Figure 3:
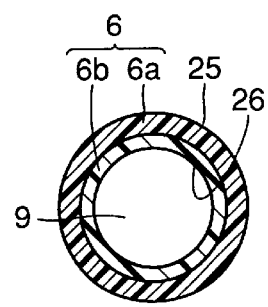
FIG. 3 is a schematic sectional view along line 200—200 in FIG. 1.
Figure 4:
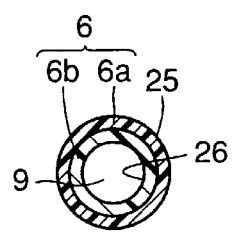
FIG. 4 is a schematic sectional view along line 300—300 in FIG. 1.

FIG. 2 is a schematic sectional view along line 100—100 in FIG. 1. FIG. 3 is a schematic sectional view along line 200—200 in FIG. 1. FIG. 4 is a schematic sectional view along line 300—300 in FIG. 1. Refering to FIGS. 1 to 4, bat 1 includes FRP layer 6, as a tubular member, which includes an outer circumference plane 25 extending from hitting portion 2 to grip portion 4 and an inner circumference plane 26 located inside outer circumference plane 25 and extending from hitting portion 2 to grip portion 4, and metal tubular member 8 which is placed between outer circumference plane 25 and inner circumference plane 26 at least in hitting portion 2. A hollow portion 9 is formed in the circumference plane 26 of bat 1, which results in a hollow type bat.

FRP layer 6 of bat 1 includes an FRP outer shell layer 6a as a first layer which is located on the outer circumference side of metal tubular member 8, and an FRP inner shell layer 6b as a second layer which is located on the inner circumference side of metal tubular member 8. Metal tubular member 8 is sandwiched between FRP outer shell layer 6a and FRP inner shell layer 6b in hitting portion 2, and is buried and integrated inside FRP layer 6.

Figure 5:
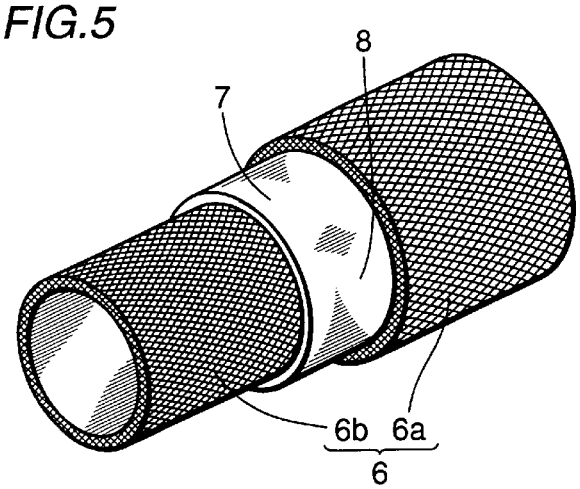
FIG. 5 is a perspective sectional view of a main part of the hitting portion of the hollow-type FRP bat according to the present invention.

Referring to FIG. 5, a surface of metal tubular member 8 is provided with a weak boundary layer 7 which is formed to prevent bonding of FRP outer shell layer 6a and FRP inner shell layer 6b with metal tubular member 8. Weak boundary layer 7 is formed by applying non-adhesive surface treatment on the surface of metal tubular member 8. Weak boundary layer 7 may include at least one selected from the group of a layer with a mirror surface finished upper surface, a plated layer, a lubricant coated layer, and an oxide film coated layer which are formed on the surface of metal tubular member 8. Thus, bonding between the surface of metal tubular member 8 on which weak boundary layer 7 is formed and FRP layer 6 can be prevented reliably.

It is noted that the mirror surface treatment is intended to reduce irregularity and damage on the surface of metal tubular member 8 as much as possible by polishing. The plated layer is formed by plating chromium, nickel chromium, and other metals on the surface of metal tubular member 8. The lubricant coated layer can be formed by priding a wax type lubricant, a silicone type lubricant, a fluorine type lubricant or the like on the surface of metal tubular member 8.

As an example of the composition of the wax type lubricant, a hydrocarbon type solvent can be from 90 wt. % to 99 wt. % for a wax from 1 wt. % to 10 wt. %. The wax type lubricant includes, for example, a solvent type lubricant and an emulsion type lubricant. As an example, the composition of the solvent type lubricant can be 10 wt. % micro wax, 1 wt. % low molecular weight polyethylene, and 89 wt. % mineral spirit.

As an example, the composition of the emulsion type lubricant can be 10 wt. % micro wax, 1 wt. % oxidized micro wax, 1.5 wt. % a tearic acid, 0.5 wt. % diethanol aBaine, and 87 wt. % water.

As the silicone type lubricant, the lubricants of the following types can be used.

(1) oil type: Although an oil which has a viscosity of approximately 100 to 1000 cSt is usually used, a highly viscous oil, which has a viscosity of approximately 10,000 to 100,000 cSt is used when higher durability is required. When an object should be paintable, an alkyl denatured silicone oil is employed.

(2) solvent type: The viscosity of an oil which serves as a base may be approximately 100 to 1000 cSt when the molding temperature is relatively low and the surface is smooth. For prounion casting at high molding temperature or for porous materials, an oil of much higher viscosity can be used. The diluted solution is selected according to the mold temperature, and solutions with relatively low boiling temperatures such as toluene and xylene are preferred when the mold temperature is as low as less than 100° C. When the mold temperature is high as in precision casting, a solution with a high boiling temperature such as mineral turpentine is preferred. The concentration employed is usually approximately 0.5 to 2%, and the solution is applied such as by spraying, brush coating, and immersing.

(3) emulsion type: Although the lubricant is advantageous with respect to economy and safety (fire prevention and hygiene) because it can be diluted with water, the diluted agent is not easily volatilized as compared with the solution type, and therefore it is not suitable when the mold temperature is low. For use, the lubricant is usually diluted to the concentration of approximately 0.5 to 2% with water, and it is applied such as by spraying, brush coating, and immersing.

(4) oil compound type: The oil compound type lubricant is a paste type lubricant which is formed by providing fine powder silica to silicone oil. Since it is superior in heat resistance, it is suitably used as a lubricant at high temperature and under high pressure.

(5) aerosol type: Since it is provided in spray cans, it is easily used for spray coating.

In addition to the lubricants of which oily nature is utilized as it is such as the ones in (1) to (5), the following lubricants which are utilized by cross-linking and reacting silicone through heating and thus forming a cured coating, that is, the bake type lubricants can also be used (6) varnish type: Since the cured coating is formed of a hard silicone resin which is three dimensionally cross-linked, the lubricant is superior in the effect of lubrication.

(7) rubber type: Since the three dimensional cross-linked points of the cured coating is fewer that those of the varnish type lubricant and the cured coating becomes a rubber-like elastic body, the lubricant is used when the long-term lubrication effect is demanded or the silicone coating is requested of flexibility.

As the oxide film coated layer, an anodized coating or an alumite coating may be formed on the surface of metal tubular member 8.

Weak boundary layer 7 may be formed on one of the outer and inner circumference planes or on both the outer and inner circumference planes of metal tubular member 8. FIG. 5 is a perspective sectional view of a main part of the hitting portion of a hollow type FRP bat according to the present invention.

As described above, in FRP bat 1 according to the present invention, FRP layer 6 and metal tubular member 8 are combined, which results in the tree layer structure of thin FRP outer shell layer 6a, metal tubular member 8, and FRP inner shell layer 6b. There is not any particular gap provided between FRP outer shell layer 6a, metal tubular member 8, and FR inner shell layer 6b.

If FlRP layer 6 and metal tubular member 8 are adhered (bonded) completely along their contact plane in a conventional manner, the three layers (FRP outer shell layer 6a, metal tubular member 8, and FRP inner shell layer 6b) of hitting portion 2 of the three layer bat move together when hitting a ball. This causes the same deformation as the one for a bat which is formed of one thick FRP layer.

In bat 1 according to the present invention, weak boundary layer 7 is thus formed (a non-adhesive interface dissociation layer is formed) between FRP outer and inner shell layers 6a, 6b and metal tubular member 8. In hitting portion 2 of bat 1, therefore, these three layers (FRP outer shell layer 6a, metal tubular member 8, and FRP inner shell layer 6b) can deform independently from one another when the bat hits a ball. As a result, the rigidity of hitting portion 2 of bat 1 in the direction of deformation can be reduced. Therefore, the three layers (FRP outer shell layer 6a, metal tubular member 8, and FRP inner shell layer 6b) of bat 1 can be deformed by impact stress at the time of ball hitting in a range which allows substantial elastic deformation without plastic deformation. Since the force of restoring the three layers from the elastically deformed state is transferred to the ball (a physical phenomenon in a springback manner is caused), the hit distance of the ball can be increased. Further, metal tubular member 8 is completely buried and integrated in FRP layer 6, and therefore FRP outer shell layer 6a can be made thinner while the strength required for an FRP bat is maintained. As a result, the rebound characteristics of the bat can be improved, which can increase further the hit distance of the ball.

Since FRP inner shell layer 6b exists on the inner circumference side of metal tubular member 8, FRP inner shell layer 6b can function as a reinforcing member for metal tubular member 8. As a result, the durability of the FRP bat can be improved reliably.

Even when weak boundary layer 7 is formed on one of the outer and inner circumference planes of metal tubular member 8, FRP outer shell layer 6a or FRP inner shell layer 6b which is not bonded with metal tubular member 8 can defonr independently from other portions including metal tubular member 8. Thus, the rigidity of bat 1 in the direction of deformation can be reduced similarly to the above case. As a result, similar effects to the above can be obtained.

When weak boundary layer 7 is formed only on the outer circumference plane of metal tubular member 8, FRP inner shell layer 6b which is located on the inner circumference plane side of the metal tubular member can function as a reinforcing member for increasing the strength of metal tubular member 8. As a result, the strength of bat 1 can be increased further.

Bat 1 according to the present invention does not have a gap provided between metal tubular member 8 and FRP layer 6 as described above. Thus, differently from the conventional bat, disclosed in U.S. Pat. No. 5,415,398, the complicated process of inserting an insert inside the hitting plane of the bat body while precisely controlling the size of the gap between the bat body (FRP layer 6) and the insert (metal tubular member 8) is not necessary. It is also unnecessary to perform the complicated process of sealing grease in the gap which is formed between the insert and the bat body. As a result, the problem of increased manufacturing cost due to the complicated and longer-term manufacturing process can be prevented. Although a bat which is manufactured by such a complicated manufacturing process may cause performance variation among different bats, the bat according to the present invention does not result in such performance variation because the bat according to the present invention does not include a gap as described above.

Since the strength of bat against impact when hitting a ball can be prevented from being insufficient by metal tubular member 8, accidents such as cracking of FRP layer 6, which is a tubular member for bat 1, and damaging of bat 1 caused by impact when the bat hits a ball can be prevented.

Since metal tubular member 8 is placed between FRE outer and inner shell layers 6a, 6b, a structure in which metal tubular member 8 is buried in FRP layer 6 can be realized Thus, the position of metal tubular member 8 can be fixed without bonding the surface of metal tubular member 8 and FRP layer 6 with adhesive, for example, (while weak boundary layer 7 is formed on the surface of metal tubular member 8).

FRP outer shell layer 6a as a first layer and FRP inner shell layer 6b as a second layer can be formed of different materials from each other. Therefore, a material which is elastically deformed easily by impact force when the bat hits a ball is used for FRP outer shell layer 6a while a material which is higher in rigidity than FRlP outer shell layer 6a is used for FRP inner shell layer 6b, and thus the strength and durability of the bat can be increased. As a result, the rebound characteristics of the bat can be improved and, at the same time, the accident of broken bats can be prevented.

Figure 6:
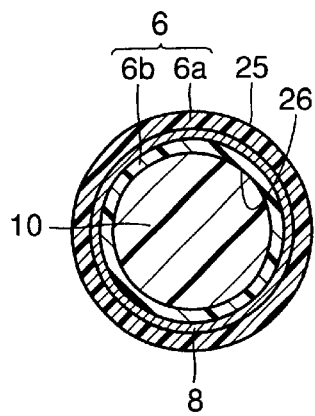
FIG. 6 is a schematic sectional view, corresponding to FIG. 2, of a first variation of the FRP bat according to the first embodiment of the present invention.
Figure 7:
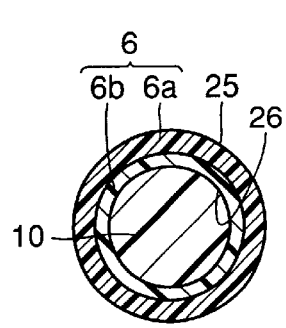
FIG. 7 is a schematic sectional view, corresponding to FIG. 3, of the first variation of the FRP bat according to the first embodiment of the present invention.
Figure 8:
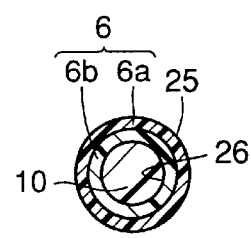
FIG. 8 is a schematic sectional view, corresponding to FIG. 4, of the first variation of the FRP bat according to the first embodiment of the present invention.

FIGS. 6 to 8 are schematic sectional views illustrating a first variation of the FRP bat according to the first embodiment of the present invention. FIG. 6 is a schematic sectional view corresponding to FIG. 2. FIG. 7 is a schematic sectional view corresponding to FIG. 3. FIG. 8 is a schematic sectional view corresponding to FIG. 4.

Referring to FIGS. 6 to 8, the first variation of the FRP bat according to the first embodiment of the present invention basically includes a similar structure to that of the bat illustrated in FIGS. 1 to 5. In the bat illustrated in FIGS. 6 to 8, however, a core member 10 is filled inside FRP inner shell layer 6b. For core member 10 filled inside FRP inner shell layer 6b, a foam synthetic resin can be used.

Figure 9:
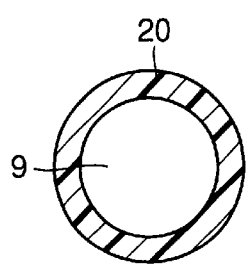
FIG. 9 is a schematic sectional view, along line 400—400 in FIG. 1, of a second variation of the FRP bat according to the first embodiment of the present invention.
Figure 10:
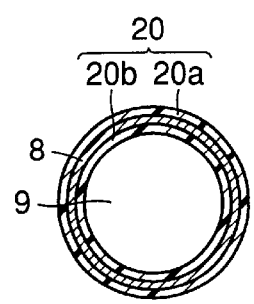
FIG. 10 is a schematic sectional view, corresponding to FIG. 2, of the second variation of the FRP bat according to the first embodiment of the present invention.
Figure 11:
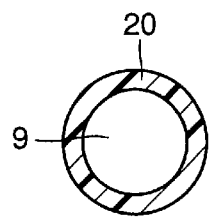
FIG. 11 is a schematic sectional view, corresponding to FIG. 3, of the second variation of the FRP bat according to the first embodiment of the present invention.
Figure 12:
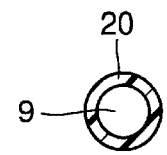
FIG. 12 is a schematic sectional view, corresponding to FIG. 4, of the second variation of the FRP bat according to the first embodiment of the present invention.

FIGS. 9 to 12 are schematic sectional views illustrating a second variation of the FRP bat according to the first embodiment of the present invention. FIG. 9 is a schematic sectional view along line 400—400 in FIG. 1. FIG. 10 is a schematic sectional view corresponding to FIG. 2. FIG. 11 is a schematic sectional view corresponding to FIG. 3. FIG. 12 is a schematic sectional view corresponding to FIG. 4.

Referring to FIGS. 9 to 12, the bat basically includes a similar structure to that of the bat illustrated in FIGS. 1 to 4. In the bat illustrated in FIGS. 9 to 12, however, an FRP layer 20 extends from hitting portion 2 (see FIG. 1) to grip portion 4 (see FIG. 1) Unlike the bat illustrated in FIGS. 1 to 4, the bat includes FRP layer 20 which is basically formed of a single layer. Metal tubular member 8 formed of aluminum is buried inside FRP layer 20 of the single layer. A weak boundary layer is formed on a surface of metal tubular member 8. An FRP layer portion 20a is located on the outer circumference plane of metal tubular member 8, and an FRP layer portion 20b is located on the inner circumference plane of metal tubular member 8.

The bat thus formed can accomplish similar effects to those of the bat, illustrated in FIGS. 1 to 4, according to the present invention.

In the following, a method of manufacturing bat 1 illustrated in FIGS. 1 to 5 will be described. FIGS. 13 to 18 are schematic views for describing a first embodiment of the method of manufacturing the FRP bat according to the present invention, using the internal pressure manufacturing process. Referring to FIGS. 13 to 18, the method of manufacturing the bat will be described.

First, a mandrel 11 (see FIG. 13) with a diameter smaller than the bat inner diameter is coated with a bag-like sleeve or prepreg sheet 21 (see FIG. 13) which is formed of glass fiber, carbon fiber, aramid fiber and other reinforcing fibers as a tubular inner circumference layer (first step).

Figure 13:
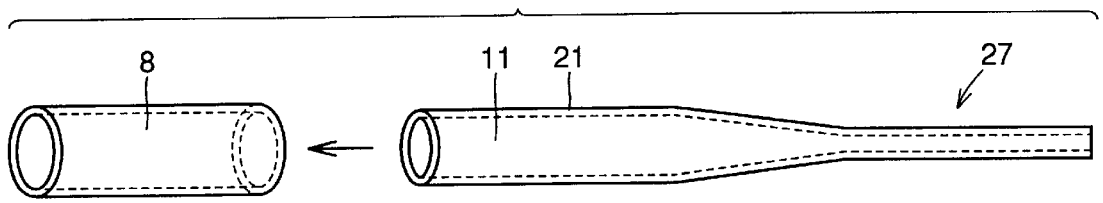
FIG. 13 is a schematic view for describing a method of manufacturing the FRP bat according to the first embodiment of the present invention.
Figure 14:
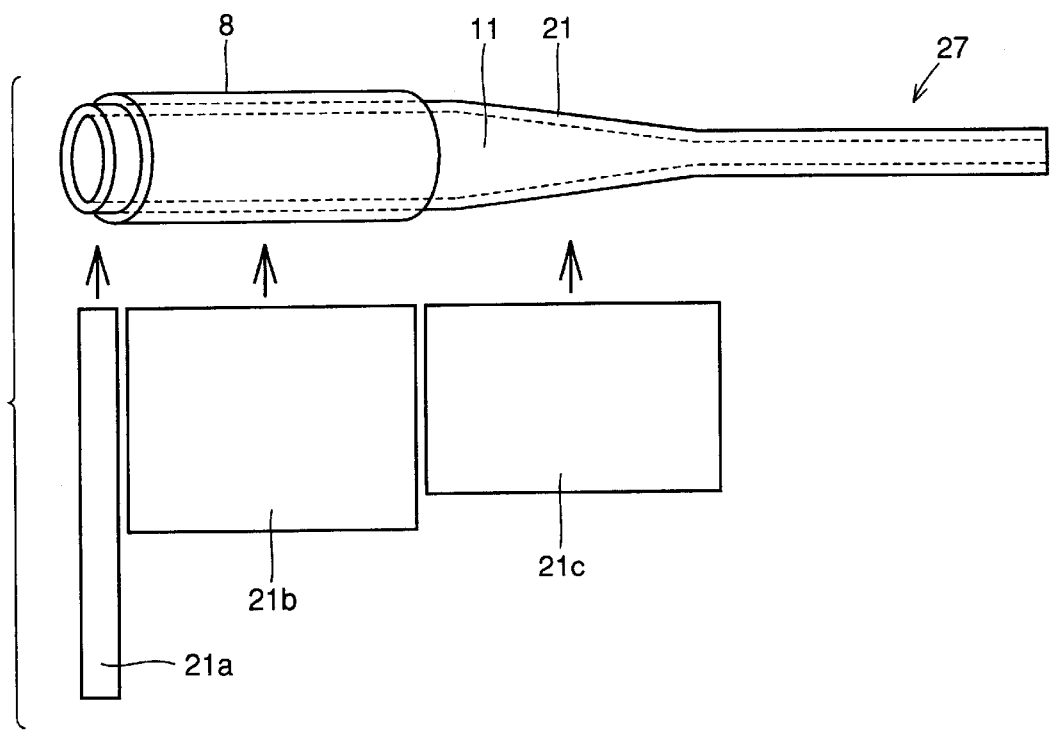
FIG. 14 is a schematic view for describing the method of manufacturing the FRP bat according to the first embodiment of the present invention.

Then, a base body 27 formed of mandrel 11 coated with sleeve or prepreg sheet 21 is prepared, and base body 27 is inserted into metal tubular member 8 as shown in FIG. 13 so as to place metal tubular member 8 on a position to be a bat hitting portion. At this time, the surface of metal tubular member 8 has been provided with at least one selected from the group of mirror surface finish, plating finish, lubricant coating, oxide film coating, and other physical and chemical non-adhesive surface treatment. A weak boundary layer is easily formed on a region provided with such surface treatment (second step).

In the method of manufacturing the bat according to the present invention, metal tubular member 8 and prepreg sheet 21 are in contact with each other. Unlike for conventional bats, the process of forming a gap between metal tubular member 8 and prepreg sheet 21 as an inner or outer circumference layer is not performed, and therefore complication of the manufacturing process can be prevented. As a result, the manufacturing cost of the bat can be reduced.

After metal tubular member 8 is placed on a prescribed position of mandrel 11 as described above, prepreg sheets 21a to 21c which serves as a tubular outer circumference layer are then placed on the surface of metal tubular member 8 and base body 27 (third step).

For prepreg sheets 21a to 21c, glass fiber, carbon fiber, aramid fiber, and other fibers can be used as reinforcing fibers. As a matrix resin, a thermosetting synthetic resin such as an epoxy resin or a thermoplastic synthetic resin such as a polyurethane resin can be used.

Figure 15:
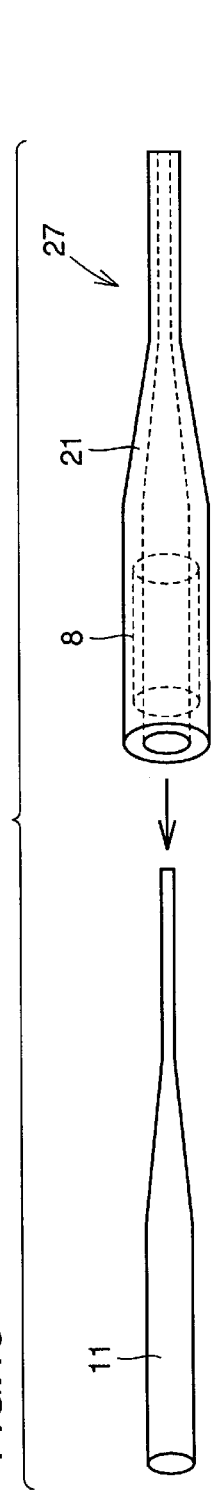

As shown in FIG. 15, mandrel 11 is then removed from base body 27 which is formed of prepreg sheet 21 and metal tubular member 8 (fourth step).

Figure 16:
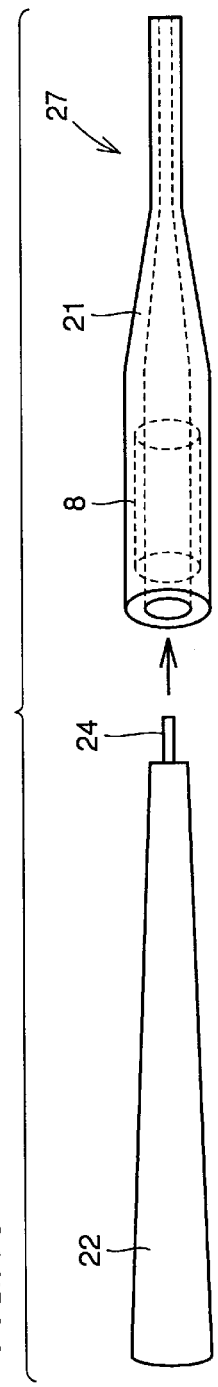
FIG. 16 is a schematic view for describing the method of manufacturing the FRP bat according to the first embodiment of the present invention.

As shown in FIG. 16, a plastic tube 22 is then inserted into base body 27 (fifth step).

While plastic tube 22 is inserted into base body 27, a plastic cap 23 (see FIG. 17) is then attached to the top end of base body 27 which is to be the top end of the bat (sixth step).

Then, the temperature of a mold for heating and molding base body 27 is set at 120° C. (seventh step).

Figure 17:
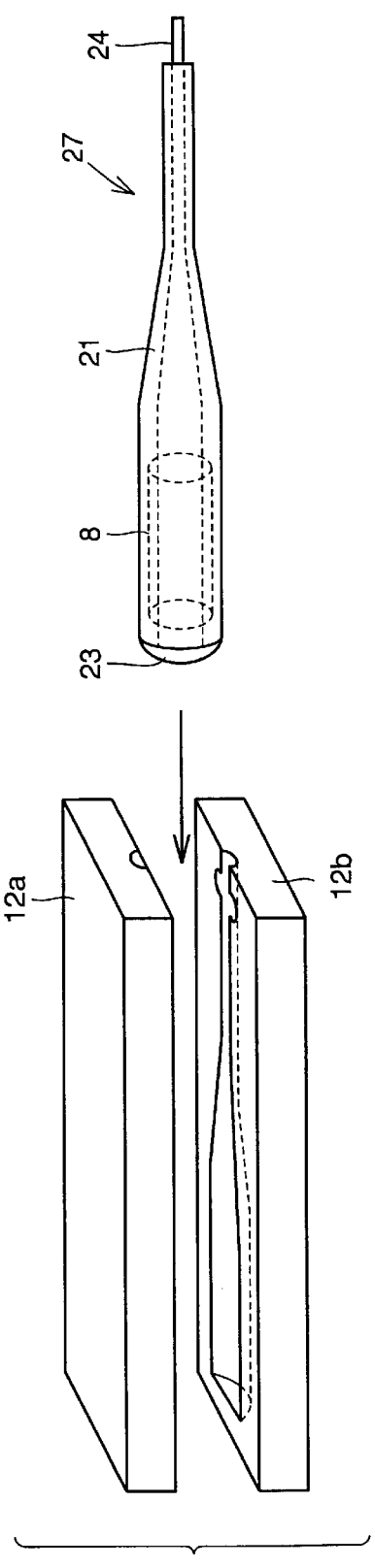
FIG. 17 is a schematic view for describing the method of manufacturing the FRP bat according to the fast embodiment of the present invention.

As shown in FIG. 17, base body 27 with attached cap 23 is then inserted into the heated mold of upper and lower molds 12a, 12b. Thereafter, upper and lower molds 12a, 12b are clamped to heat the entire mold (eighth step).

At this time, an air inlet 24 of plastic tube 22 is projected from the grip end of base body 27.

Figure 18:
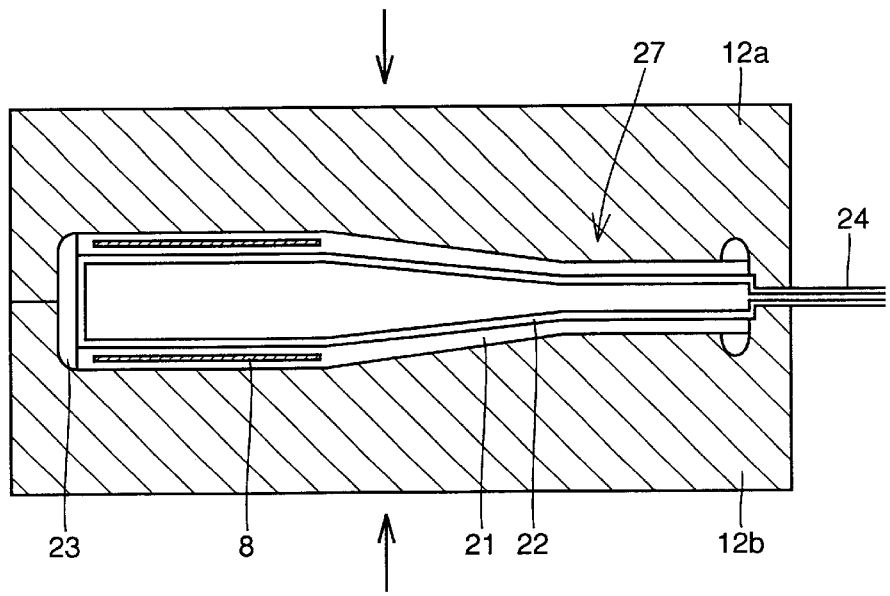
FIG. 18 is a schematic sectional view for describing the method of manufacturing the FRP bat according to the first embodiment of the present invention.

As shown in FIG. 18, pressurized air is then introduced into plastic tube 22 through air inlet 24 which is located at the grip end of base body 27. As a result, pressure is applied to base body 27 from inside. That is, pressure can be applied to the inner circumference layer toward the outer circumference layer. The pressure at this time is 15 to 20 kg/cm$^2$, and the pressurizing time is about 20 minutes (ninth step).

Then, the pressure which has been applied to plastic tube 22 is stopped, and upper and lower molds 12a, 12b are opened to remove base body 27 which is to be a molded bat (tenth step).

Then, the plastic tube which remains inside base body 27 is removed (eleventh step).

Then, base body 27 is heated at a temperature of 130° C. for six hours to completely cure the matrix resin of the prepregs which form base body 27 (twelfth step).

Thereafter, the surface of base body 27 is polished by an polisher. The hole of the grip end is closed by stuffing a resin in the hole. The surface of base body 27 is painted with a base color and then dried. Then, the surface of base body 27 is given a water transfer seal and dried. Then, it is given a clear painting and dried. Thus, the bat is completed. Thereafter, the bat is covered with a shrink back for wrapping and it is dried by hot wind. The bat is thus wrapped by shrinking the shrink back.

As described above, the FRP bat according to the present invention can be manufactured by using the internal pressure manufacturing process.

The outline of the method of coating prepieg sheets or the like in the first to third steps is shown in Table 1.

TABLE 1

| Step No. | | Member name Fiber angle with respect to bat longitudinal direction (X̊) | Weight per unit area of prepreg | Area of prepreg | Mass of prepreg | |
|---|---|---|---|---|---|---|
| Main step | Step | Number of sheets | (g/m$^2$) | (m$^2$) | (g) | Remarks |
| First step | 1-1 | GF sleeve — — | 32 | 0.95 | 30.4 | Entire length Size: 96 × 2 × 95 (cm) |
| | 1-2 | CF 45 2 | 370 | 0.076 | 28.12 | 24 cm, 26 cm from top end |
| | 1-3 | GF 60 1 | 426 | 0.0853 | 36.3165 | 2 cm from top end |
| | 1-4 | CF 0 2 | 433 | 0.3090 | 134.0568 | |
| | | CF 0 2 | 433 | 0.1764 | 76.5812 | |
| | 1-5 | GF 60 1 | 426 | 0.0476 | 20.2776 | 2 cm from top end |
| | 1-6 | CF 45 1 | 370 | 0.038 | 14.06 | 28 cm from top end |
| Second step | — | Aluminium alloy pipe — — | — | — | 153 | Aluminum alloy pipe thickness: 1.3 mm diameter: 54 mm length: 260 mm 2 cm from top end |
| Third step | 3-1 | GF 90 | 414 | 0.0102 | 74.2228 | 28 cm from top end |
| | 3-2 | GF 60 1 | 426 | 0.1425 0.1425 | 60.705 60.705 | 0 cm from top end |
| | 3-3 | CF 45 8 | 370 | 0.114 | 42.18 | 25 cm, 27 cm, 29 cm from top end |

TABLE 1-continued

| Step No. | | Member name Fiber angle with respect to bat longitudinal direction (※) | Weight per unit area of prepreg | Area of prepreg | Mass of prepreg | |
|---|---|---|---|---|---|---|
| Main step | Step | Number of sheets | (g/m²) | (m²) | (g) | Remarks |
| | 3-4 | GF<br>45<br>1 | 426 | 0.0608 | 25.9008 | 0 cm from top end |
| | 3-5 | CF<br>±45<br>1 | 368 | 0.02655 | 9.7178 | 32 cm from top end |
| | 3-6 | GF<br>45<br>1 | 426 | 0.018 | 7.668 | 50 cm from top end |
| Sixth step | — | GF<br>—<br>— | — | 79 | 79 | Top end CAP:49 g<br>GF:30 g for grip end |

※(note)
GF is a glass fiber prepreg.
CF is a carbon fiber prepreg.
Concerning the expressions in Remarks, "2 cm from top end", for example, in the step 1-3 means that a glass fiber prepreg is coated on a mandrel from the position which is 2 cm away from the top end of the mandrel As can be seen from Table 1, in the above described first step, a glass fiber sleeve (GF sleeve) is coated on a mandrel from a portion, which corresponds to the top end of a bat, through the hitting portion to the taper portion (step 1-1). Then, carbon fiber prepreg sheets are coated on a portion which corresponds to the taper portion of the bat (step 1-2). The angle of the prepreg sheet fibers at this time is an inclination angle of ±45° with respect to the longitudinal direction of the bat. Then, a glass fiber prepreg sheet is coated on a portion which corresponds to the hitting portion of the bat (step 1-3). The inclination angle at this time is ±60° with respect to the longitudinal direction of the bat. Then, carbon fiber prepreg sheets are coated on a portion from the top end to the grip end of the bat (step 1-4). The inclination angle at this time is 0° with respect to the longitudinal direction of the bat. Further, a glass fiber prepreg sheet is coated on the hitting portion of the bat (step 1-5). The inclination of the prepreg sheet at this time is ±60° with respect to the longitudinal direction of the bat. Then, a carbon fiber prepreg sheet is coated on the taper portion (step 1-6). The inclination of the prepreg sheet at this time is ±45° with respect to the longitudinal direction of the bat. In this way, prepreg sheets are coated on portions of the mandrel in the first step.

Thereafter, a metal tubular member is placed on a portion which corresponds to the hitting portion by inserting the mandrel (base body) which is coated with the prepregs into the metal tubular member of an aluminum alloy. (step 2-1). For the aluminum alloy at this time, an aluminum alloy which is equivalent to ASTM 7050 can be used. The size of the metal tubular member is as shown in Table 1.

Then, a glass fiber prepreg sheet is coated on the top end and rear end sides of the metal tubular member to eliminate a step caused by the thickness of the metal tubular member (step 3-1). The inclination angle of the prepreg sheet at this time is 90° with respect to the longitudinal direction of the bat. Then, a glass fiber prepreg sheet is coated on the hitting portion to cover the metal tubular member (step 3-2). The inclination angle of the prepreg sheet at this time is ±60° with respect to the longitudinal direction of the bat.

Then, a carbon fiber prepreg sheet is coated on the taper portion (step 3-3). The inclination angle of the prepreg sheet at this time is ±45° with respect to the longitudinal direction of the bat. Then, a glass fiber prepreg sheet is coated on the hitting portion (step 3-4). The inclination angle of the prepreg sheet at this time is ±45° with respect to the longitudinal direction of the bat. Then, a carbon fiber prepreg sheet is coated on the taper portion (step 3-5). The inclination angle of the prepreg sheet at this time is ±45° with respect to the longitudinal direction of the bat. Then, a glass fiber prepreg sheet is coated on the grip portion (step 3-6). The inclination angle of the prepreg sheet at this time is ±45° with respect to the longitudinal direction of the bat. The above described third step is performed in this manner.

Thereafter, as shown with respect to the fourth to sixth steps, after prepreg coating, the mandrel is removed and a plastic tube with an air inlet (adapter) is inerted in the hollow portion. A plastic cap of a polyurethane resin, for example, is introduced into an opening which corresponds to the top end of the bat. A base body which is to be the bat is placed in the mold which has been heated to 120° C., and a rod-like glass fiber prepreg sheet is placed on a portion which corresponds to the grip end. The mold is clamped, and the entire mold is maintained at 120° C. Then, pressurized air is introduced into the plastic tube from air inlet 24 (see FIG. 18) of the tube which projects from the grip end. The internal pressure molding of the bat is thus performed by applying pressure from the interior of the base body.

By the above described internal pressure molding method, the thickness of FRP inner shell layer 6b (see FIG. 2) in the hitting portion of the formed FRP bat is about 1.5 mm, the thickness of the metal tubular member of an aluminum alloy is about 1.3 mm, and the thickness of FRP outer shell layer 6a (see FIG. 2) is about 1.5 mm.

As the matrix resin of the FRP bat according to the present invention, an epoxy resin can be used.

Second Embodiment

Figure 19:
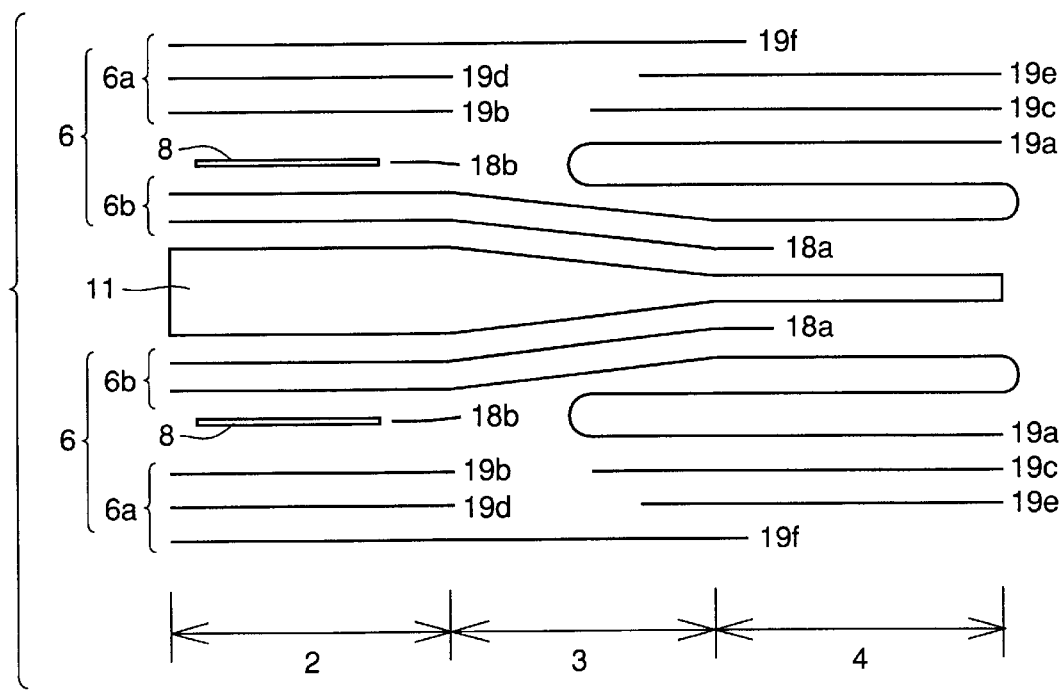
FIG. 19 is a schematic view illustrating the arrangement of reinforcing fibers and the like in an FEF bat according to a second embodiment of the present invention.
Figure 20:
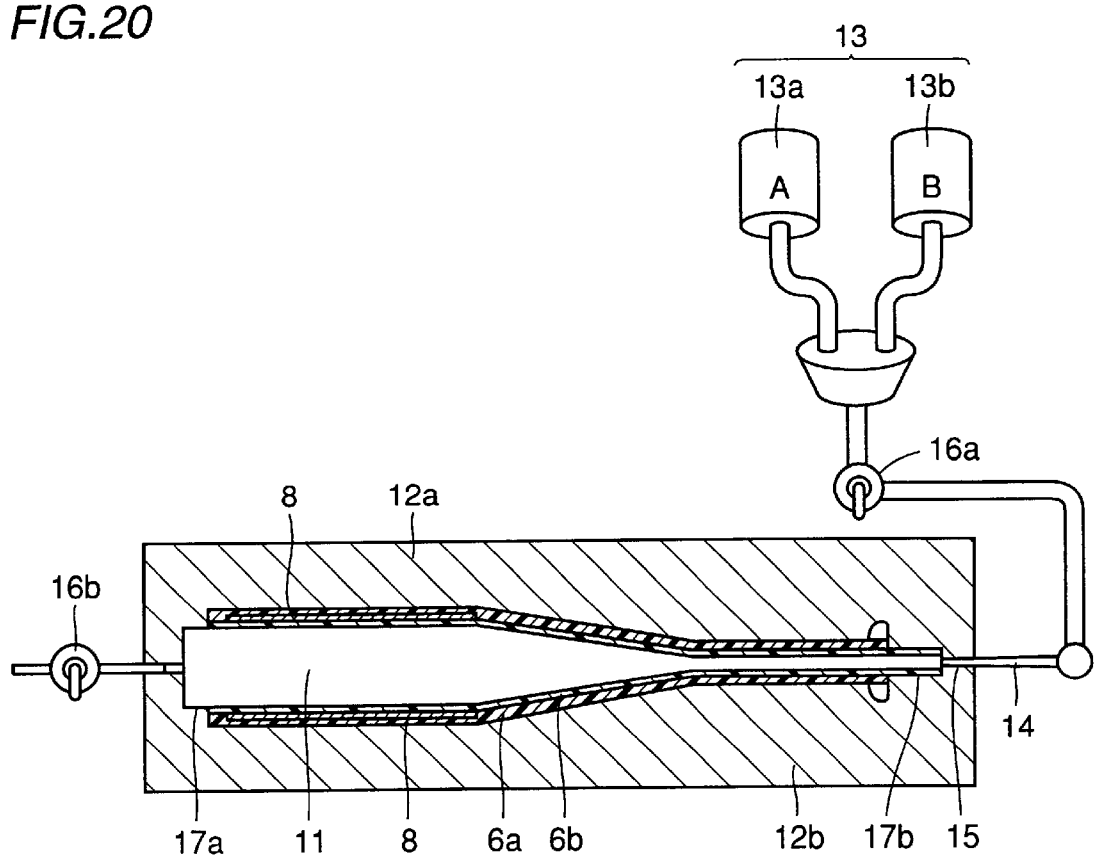
FIG. 20 is a schematic view for describing the method of manufacturing the FRP bat according to the second embodiment of the present invention.

FIG. 19 is a schematic view illustrating the arrangement of reinforcing fibers and the like in the FRP bat according to a second embodiment of the present invention. FIG. 20 is a schematic view for describing the method of manufacturing the FRP bat according to the second embodiment of the present invention. In the following, the method of manufacturing the bat will be described with reference to FIGS. 19 and 20.

Although the bat according to the present invention can be manufactured by the internal pressure manufacturing process as described above, it can be manufactured even by the reaction injection molding (RIM) process as described below. The arrangement of the reinforcing fibers and the metal tubular member of a bat in the RIM manufacturing process is shown in FIG. 19.

Referring to FIG. 19, one ply of a glass fiber sleeve 18a is first coated on a portion from a region, which is to be the top end of a bat, through hitting portion 2 to taper portion 3 of mandrel 11. Then, one ply of a carbon fiber sleeve 19a is coated hom the region, which is to be the top end of a bat, through hitting portion 2 and taper portion 3 to the grip end of grip portion 4. Further, carbon fiber sleeve 19a is folded back at the grip end and also folded back almost in the middle of taper portion 3. At the fold back point almost in the middle of the taper portion, sleeve 19a is partially cut to reduce a thickness difference. Carbon fiber sleeve 19a is placed to extend to the grip end.

Then, metal tubular member 8 is placed to be on hitting portion 2. The surface of metal tubular member 8 has been provided with surface treatment for forming a weak boundary layer similarly to the method of manufacturing the bat according to the first embodiment. In order to eliminate a step caused by the thickness of metal tubular member 8, one ply of glass fiber sleeve 18b is coated to extend from the read end of metal tubular member 8 to the upper end of taper portion 3.

Further, carbon fiber sleeves 19b, 19d are coated from the region which is to be the top end of the bat to hitting portion 2 and the upper end of taper portion 3. Carbon fiber sleeves 19c, 19e are also coated from almost the middle of taper portion 3 to the grip end so that sleeves 19c, 19e are slightly offset from each other. Thereafter, a carbon fiber sleeve 19f is coated on the most outside circumference to extend from the top end of the bat through hitting portion 2 and taper portion 3 to the upper end of grip portion 4.

The base body (which is also called a pre-molded body) which is formed of metal tubular member 8, glass fiber sleeves 18a, 18b, and carbon fiber sleeves 19a to 19f in this manner is placed in upper and lower molds 12a, 12b as shown in FIG. 20. Here, one example of data on glass fiber sleeves 18a, 18b and carbon fiber sleeves 19a to 19f which form the base body is shown in Table 2.

Referring to FIG. 20, the base body is placed inside upper and lower molds 12a, 12b, and a matrix rean is injected into the mold. Thus, a bat can be manufactured by the RIM process.

The method of manufacturing a bat using the RIM process will be described in the following.

First, glass fiber sleeve 8a and carbon fiber sleeve 19a (see FIG. 19) are coated on mandrel 11 (see FIG. 19), to which a lubricant is applied, as described above. As sleeves 18a, 19a, bag-like sleeves which are formed of glass fiber, carbon fiber, aramid fiber or other reinforcing fibers as described above can be used. Further, braids, cloths, or the like can be selected in stead of the sleeves (first step).

Then, metal tubular member 8 which has been provided with surface treatment for forming a weak boundary layer is placed on a region to be a hitting portion (second step).

Then, metal tubular member 8 and other regions on mandrel 11 are coated with glass fiber sleeve 18b and carbon fiber sleeves 19b to 19f (see FIG. 19). In stead of these glass fiber sleeves and carbon fiber sleeves, bag-like sleeves of aramid fiber or other reinforcing fibers may be used. Braids, cloths or the like may also be used (third step).

Then, the temperature of upper and lower molds 12a, 12b (see FIG. 20) is set at a temperature from 135° C. to 145° C. (fourth step).

As shown in FIG. 20, the base body which is formed of mandrel 11, glass fiber sleeves 18a, 18b, carbon fiber sleeves 19a to 19f, and metal tubular member 8 is then set inside upper and lower molds 12a, 12b. A carbon non-woven cloth is stuffed into the grip end, and the entire body is heated (fifth step).

While upper and lower molds 12a, 12b are clamped and a cock 16a, which is provided at a tube for introducing a matrix resin, is closed, a cock 16b, which is provided at a conduit connected to a gap in the mold on the top end side of mandrel 11, is opened. The conduit provided with cock 16b is connected to a vacuum pump. By operating the vacuum pump, the space inside molds 12a, 12b in which the base body is placed is evacuated (sixth step).

Then, a matrix resin is filled in a tank 13. By opening cock 16a, the matrix resin is introduced into the space inside the mold (seventh step).

TABLE 2

| Step No. of coating sleeve and the like | Coating member | Number of fibers used for weaving sleeve | Fiber angle with respect to bat longitudinal direction (X) | Length for cutting sleeve (mm) | Achievable length of fibers from top end of bat (mm) | Number of filaments |
| --- | --- | --- | --- | --- | --- | --- |
| 1 | GF | 96 | 50 | 750 | 700 | 12000 |
| 2 | CF | 64 | 30 | 1350 | Entire length of mandrel | 12000 |
| 2 | CF | 64 | 30 | Fold back at grip end | 550 | 12000 |
| 2 | CF | 64 | 30 | Fold back and cut at taper portion center | 550 | 12000 |
| 3 | CF | 64 | 30 | 300 | 550 | 12000 |
| 4 | CF | 64 | 30 | 300 | 650 | 3000 |
| 5 | Aluminum alloy pipe | — | — | 260 | 310 | — |
| 6 | GF | 96 | 50 | 200 | 500 | 12000 |
| 7 | CF | 64 | 30 | 500 | 450 | 12000 |
| 8 | CF | 64 | 30 | 500 | 450 | 12000 |
| 9 | CF | 96 | 50 | 750 | 700 | 6000 |

X(note)
GF is a glass fiber sleeve.
CF is a carbon fiber sleeve.

When the matrix resin reaches the conduit on the top end side of the bat, the flow of the matrix resin is controlled and air bubbles are removed from the mold (eighth step). Thus, a uniform matrix resin without air bubbles can be introduced into the mold. As a result, a high quality bat which does not include a defect such as au air bubble in the matrix resin can be obtained.

Then, the matrix resin in the mold is cured (ninth step).

Then, upper and lower molds 12a, 12b are opened to remove the molded base body. Mandrel 11 is then removed from the base body (tenth step).

In order to cross-link the base body (molded body) once again, aging is carried out in the cross-linking temperature region (eleventh step).

Thereafter, a cap is attached to the top end of the bat and a process such as painting is performed. Thus, the bat according to the present invention can be manufactured.

In the FRP bat according to the present invention which is manufactured by the above described RIM process, FRP inner shell layer 6b (see FIG. 2) in the hitting portion has a thickness of about 1.7 mm, the aluminum alloy pipe as metal tubular member 8 (see FIG. 2) has a thickness of about 1.3 mm, and FRP outer shell layer 6a has a thickness of about 1.7 mm.

As an example of the composition of the matrix resin in the manufacturing method of the FRP bat according to the present invention, using the RIM process, the following composition is possible.

MDA:BPO: matrix resin (epoxy resin)=4:4:1

Here, MDA is a thermosetting polyester amide and BPO is a benzoyl peroxide. When the matrix resin is injected in the RIM process shown in FIG. 20, MDA and BPO are provided in a matrix resin tank 13a while an epoxy resin and 1,4-dibromobutane as a catalyst are provided in a matrix resin tank 13b.

In the method of manufacturing the FRP bat according to the present invention, the base body may be coated with sleeves or the like, impregnated with a matrix resin, and heated and cured as it is while it is placed in the mold. Further, the sleeves may be coated on a mandrel impregnated with a matrix resin to form prepregs, the mandrel coated with the sleeves, which have become the prepregs, may be placed in the mold, and the sleeves, which have become the prepregs, may be heated and cured.

In the method of manufacturing the bat according to the present invention, the resin transfer (RTM) process may be used.

In the first and second embodiments, 6000 type or 7000 type aluminum alloys according to the ASTM standard can be used as a material for forming the metal tubular member. Of the aluminum alloys 7001, 7049, 7050, 7075, 7178, 6061 which particularly satisfy the ASTM standard are preferably used. By using such aluminum alloys, the strength and durability of the bat can be improved further.

As a material for forming the metal tubular member, a titanium alloy and pure titanium may be used. For example, β type or α+β type titanium alloys are preferably used.

As other materials for forming the metal tubular member, other titanium alloys (such as Ti-6Al-4V, Ti-4Al-22V, Ti-15V-3Cr-3Al-3Sn, Ti-4.5Al-3V-2Fe-2Mo, Ti-10V-2Fe-3Al) may be used.

The embodiments disclosed herein are understood to be illustrative and not limiting in any sense. It is intended that the scope of the present invention is not limited by the above described embodiments but by the claims and it covers all modifications equivalent to the claims.

What is claimed is:

1. A baseball or softball bat including a hitting portion, a taper portion, and a grip portion, comprising:

a tubular member formed of fiber reinforced plastic and including an outer circumference plane extending from said hitting portion to said grip portion, and an inner circumference plane located inside the outer circumference plane and extending from said hitting portion to said grip portion; and a metal tubur member placed said outer circumference plane and said inner circumference plane at least in said hitting portion and embedded in the thickness of said tubular member formed on its surface formed of fiber reinforced plastic, said metal tubular member having a lubricant coated layer as a weak boundary layer.

2. The baseball or softball bat according to claim 1, wherein said fiber reinforced plastic tubular member includes a first layer located on an outer circumference side of said metal tubular member, and a second layer located on an inner circumference side of said metal tubular member.

3. The baseball or softball bat according to claim 1, wherein said weak boundary layer is formed on one of outer and inner circumference planes of said metal tubular member or on both said outer and inner circumference planes of said metal tubular member.

4. The baseball or softball bat according to claim 1, wherein said fiber reinforced plastic tubular member is formed by impregnating a resin into a fiber member which is formed to a tubular shape.

5. A method of manufacturing a baseball or softball bat including a hitting portion, a taper portion, and a grip portion, comprising the steps of:

forming a tubular inner circumference layer to be a part of a tubular member formed of fiber reinforced plastic to extend from said hitting portion to said grip portion;

placing a metal tubular member at least on a region of said inner circumference layer which is to be the hitting portion;

forming a lubricant coated layer as a weak boundary layer on a surface of said metal tubular member;

forming a tubular outer circumference layer to be a part of a tubular member formed of fiber reinforced plastic to cover at least said metal tubular member; and integrating said tubular inner circumference layer and said tubular outer circumference layer forming a tubular member of fiber reinforced plastic;

wherein said metal tubular member is embedded within said tubular member formed of fiber reinforced plastic.

6. The method of manufacturing a baseball or softball bat according to claim 5, wherein said step of forming said inner circumference layer includes the step of forming a tubular inner circumference fiber layer (18a, 19a) to extend from said hitting portion to said grip portion, said step of forming said outer circumference layer includes the step of forming a tubular outer circumference fiber layer (19b to 19f) to cover at least said metal tubular member, and said method further comprising the step of impregnating a resin into said inner circumference fiber layer and said outer circumference fiber layer.

7. The method of manufacturing a baseball or softball bat according to claims 5, further comprising the step of applying pressure on said inner circumference layer toward said outer circumference layer.

8. A baseball or softball bat including a hitting portion, a taper portion and a grip portion, comprising:
- a tubular member formed of fiber reinforced plastic;
- a metal tubular member;
- said fiber reinforced plastic tubular member having a first layer located on an outer circumference side of said metal tubular member;
- said fiber reinforced plastic tubular member having a second layer located on inner circumference side of said metal tubular member, wherein said metal tubular member is embedded in said tubular member of fiber reinforced plastic between said first and second layers; and
- a weak boundary layer formed on a surface of said metal tubular member.

9. The baseball or softball bat according to claim 8, wherein said weak boundary layer includes a layer which is formed by providing non-adhesive surface treatment on the surface of said metal tubular member.

10. The baseball or softball according to claim 9, wherein
- said weak boundary layer includes at least one selected from the group of a layer with a mirror surface finished upper surface, a plated layer, a lubricant coated layer, and an oxide film coated layer.

11. The baseball or softball bat according to claim 8, wherein
- said weak boundary layer is formed on one of outer and inner circumference planes of said metal tubular member or on both said outer and inner circumference planes of said metal tubular member.

12. The baseball or softball bat according to claim 8, wherein
- said fiber reinforced plastic tubular member is formed by impregnating a resin into a fiber member which is formed to a tubular shape.

13. A baseball or softball bat including a hitting portion, a taper portion, and a grip portion, comprising:
- a tubular member formed of fiber reinforced plastic and including an outer circumference plane of fiber reinforced plastic defining an outer profile of the bat extending from said hitting portion to said grip portion, and an inner circumference plane of filter reinforced plastic;
- a metal tubular member having a predefined length;
- said inner circumference plane of fiber reinforced plastic having a length greater than said metal tubular member; and
- said metal tubular member placed between said outer circumference plane of fiber reinforced plastic and said inner circumference plane of fiber reinforced plastic at least in said hitting portion and embedded in the thickness of said tubular member of fiber reinforced plastic.

* * * * *